Patented Feb. 19, 1929.

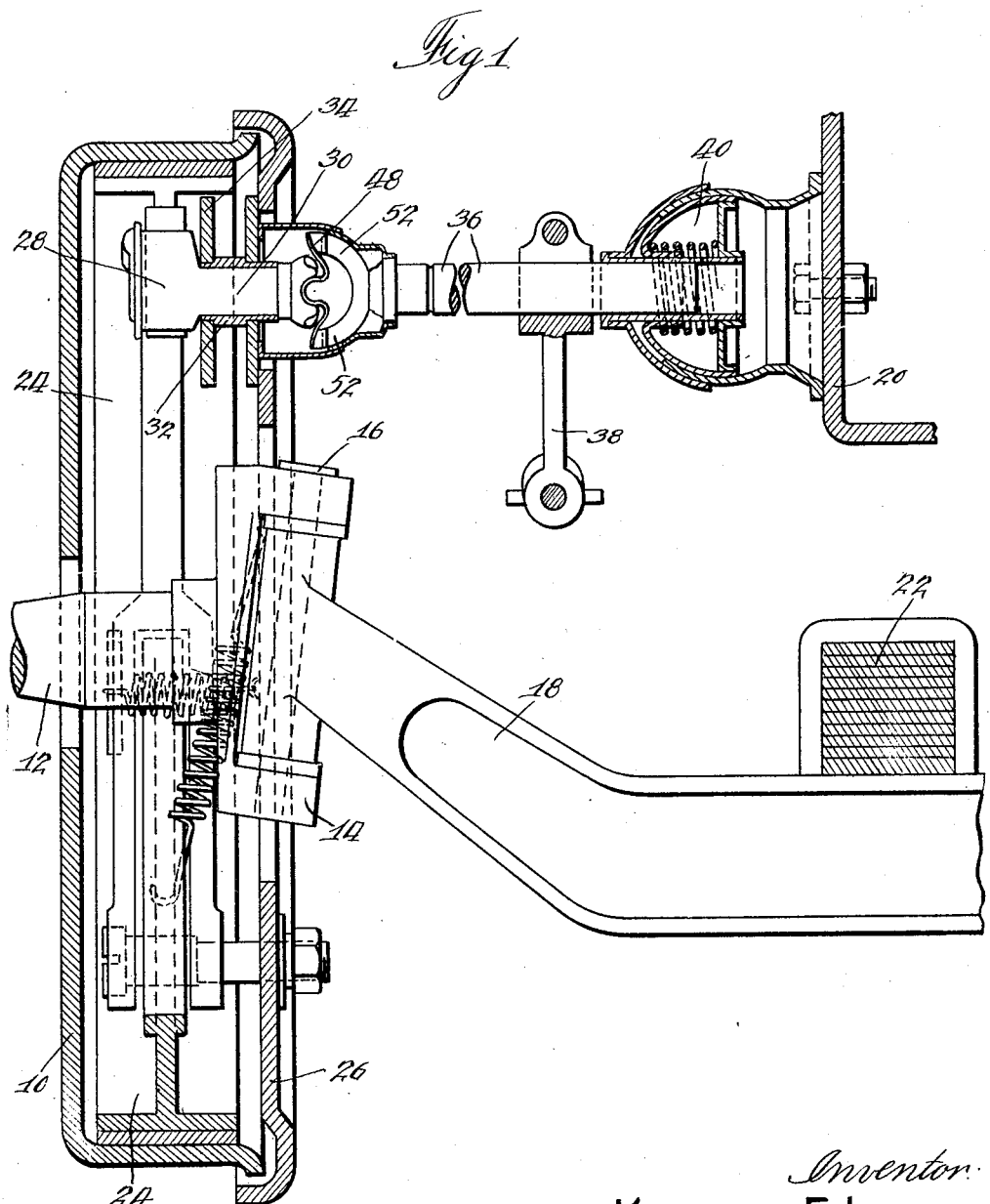

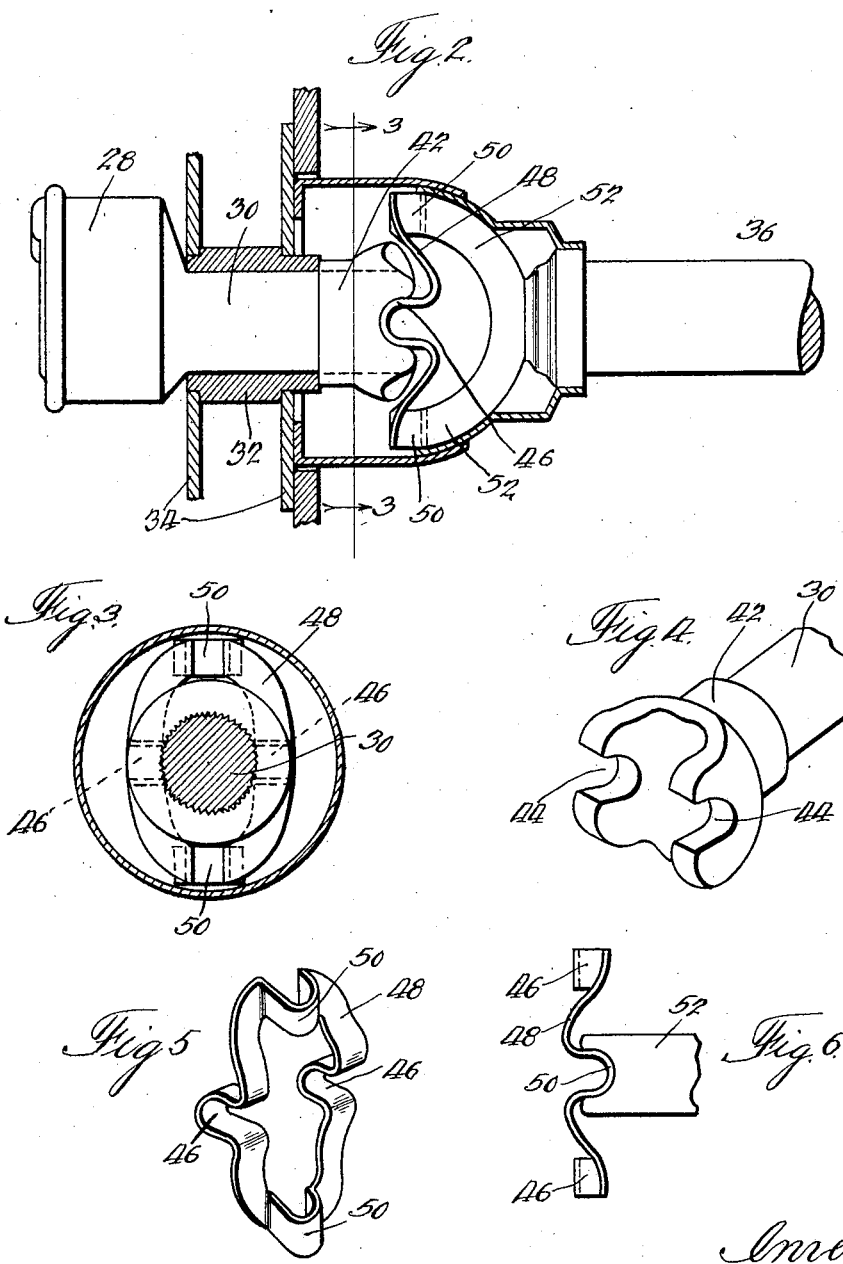

1,702,407

UNITED STATES PATENT OFFICE.

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS.

BRAKE-OPERATING MEANS.

Application filed June 7, 1927. Serial No. 197,180.

This invention relates to brakes, and is illustrated as embodied in novel operating means for a front wheel automobile brake. An object of the invention is to provide an exceptionally compact universal joint above the king-pin,—i. e. in the swivelling axis of the wheel,—thus avoiding taking up any of the very limited space between that axis and the center of the brake and permitting the use of a camshaft bearing of maximum length.

To this end, the brake-applying torque is transmitted from the operating shaft to the camshaft (or its equivalent) by a novel connecting device, illustrated as pressed from sheet metal and which is preferably arranged between the ends of the shafts. In the arrangement shown in the drawing, the shafts have pairs of jaws at right angles to each other, and embracing corresponding projections on the connecting device.

The above and other objects and features of the invention, including various novel and desirable details of construction, will be apparent from the following description of one illustrative embodiment shown in the accompanying drawing, in which:

Figure 1 is a vertical section through one front brake and associated parts, and showing the shafts in front elevation;

Figure 2 is a view of part of Figure 1 on a large scale;

Figure 3 is a section through the novel joint on the line 3—3 of Figure 2;

Figure 4 is a perspective view of the end of one of the shafts;

Figure 5 is a perspective view of the novel connecting device; and

Figure 6 is a top plan view showing the interengagement of the connecting device with the operating shaft.

The brake shown in Figure 1 includes a drum 10, rotating with a wheel (not shown) mounted on the spindle 12 of a knuckle 14 swivelled, by a king-pin 16 or the like, to an axle 18. Axle 18 supports a chassis frame 20 through the usual springs 22.

The friction means of the brake is illustrated as comprising shoes 24, carried by a backing plate 26 mounted on the knuckle 14, and operated by means such as a cam 28 having a shaft 30 journalled in a bearing 32, shown as a bushing connecting two plates 34 mounted on the backing plate 26.

Shaft 30 is rocked, to apply the brake, through a novel universal joint in line with the king-pin 16 (i. e. intersected by the swivelling axis of the wheel) by means of an operating shaft 36. Shaft 36 is operated by an arm 38, and is slidably and universally carried at its inner end by a support 40 mounted on the chassis frame.

Shaft 30 is serrated at its end, and there is pressed on that end a part 42 formed with a pair of horizontally arranged thrust parts or jaws 44 embracing corresponding projections 46 on one side of a stamped or pressed steel connecting device 48 arranged between the ends of shafts 30 and 36.

On its opposite side, the connecting device 48 is formed with similar projections or thrust parts 50, spaced further apart than projections 46, and arranged at right angles to the projections 46. These vertical projections 50 are received in corresponding pairs of jaws 52 on a part carried by the shaft 36.

While one illustrative embodiment has been described in detail, it is not my intention to limit the scope of the invention to that particular embodiment, or otherwise than by the terms of the appended claims.

I claim:

1. Operating means comprising, in combination, shafts arranged end to end and having at their adjacent ends pairs of thrust parts at right angles to each other, and a sheet metal connecting device having corresponding pairs of extensions interposed between the opposite adjacent end portions of said shafts and having corresponding pairs of thrust parts bent laterally out of the plane of the extensions substantially at right angles thereto and at right angles to each other and on opposite sides of the connecting device and interengaging with the thrust parts of the shafts for pivotal movement therewith.

2. Operating means comprising, in combination, shafts arranged end to end and having at their adjacent ends pairs of jaws at right angles to each other, and a sheet metal connecting device interposed between the ends of said shafts and distorted in opposite directions forming corresponding pairs of projections at right angles to each other and on opposite sides of the connecting device and received in said jaws.

3. Operating means comprising, in combination, shafts arranged end to end and having at their adjacent ends pairs of thrust parts at right angles to each other, and a connecting device having corresponding pairs of thrust parts at right angles to each other and on opposite sides of the connecting device and fitting within the thrust parts of the shafts, said connecting device being arranged between the adjacent ends of said shafts.

4. Operating means comprising, in combination, shafts arranged end to end and having at their adjacent ends pairs of jaws at right angles to each other, and a connecting device having corresponding pairs of projections at right angles to each other and on opposite sides of the connecting device and received in said jaws, said connecting device being arranged between the adjacent ends of said shafts.

5. A universal joint connection for a pair of shafts arranged end to end and having thrust parts arranged at right angles to each other comprising, in combination therewith, an integral sheet metal connection interposed between the adjacent ends of the shafts, said connection having projecting parts bent laterally therefrom at right angles to each other and to the plane of the connection and arranged on opposite sides thereof interengaging with the thrust parts of the shafts for pivotal movement therewith.

6. A universal joint connection for a pair of shafts arranged end to end and having relatively angularly arranged thrust portions formed on their adjacent ends comprising, in combination therewith, a sheet metal connection distorted laterally to engage within the thrust parts of the shafts forming a bearing therebetween and a connection therefor.

7. A universal connection for a pair of shafts arranged end to end and provided with thrust portions arranged at right angles to each other comprising, in combination therewith, a flexible sheet metal connection having thrust portions bent laterally therefrom and interengaged within the thrust portions of the shafts forming a flexible bearing between the ends of the shafts and a connection therefor.

In testimony whereof, I have hereunto signed my name.

KENNETH E. LYMAN.